United States Patent [19]
Garrett

[11] 3,895,920
[45] July 22, 1975

[54] METHOD OF PRODUCING COARSE POTASH

[76] Inventor: Donald E. Garrett, 505 W. Ninth St., Claremont, Calif. 91711

[22] Filed: Sept. 17, 1973

[21] Appl. No.: 397,963

Related U.S. Application Data

[63] Continuation-in-part of Ser. No. 69,219, Sept. 3, 1970, abandoned.

[52] U.S. Cl. .................. 23/298; 23/302; 423/499
[51] Int. Cl. ...... B01d 9/00; C07d 3/00; C13k 1/10; C09d 1/30
[58] Field of Search ............ 23/298, 300, 302, 303, 23/304; 423/179, 499

[56] References Cited
UNITED STATES PATENTS

| | | | |
|---|---|---|---|
| 1,215,546 | 2/1917 | Jones et al. ............................ | 23/298 |
| 1,593,038 | 7/1926 | Silsbee .................................. | 23/298 |
| 2,479,001 | 8/1949 | Burke et al. ........................... | 23/304 |
| 2,687,339 | 8/1954 | Dancy et al. .......................... | 23/302 |
| 2,702,121 | 2/1955 | Colin et al. ........................ | 209/166 |
| 2,759,794 | 8/1956 | Fuchsman ............................. | 23/302 |
| 2,827,366 | 3/1958 | Saeman ............................ | 23/302 X |
| 2,968,525 | 1/1961 | Clark et al. ......................... | 423/179 |
| 3,323,875 | 6/1967 | Been .................................... | 23/302 |
| 3,440,023 | 4/1969 | Hoppe et al. ......................... | 23/298 |
| 3,442,553 | 5/1969 | Kutz ............................... | 423/179 X |
| 3,512,945 | 5/1970 | Taylor et al. ......................... | 23/300 |

FOREIGN PATENTS OR APPLICATIONS

| | | | |
|---|---|---|---|
| 91,906 | 4/1897 | Germany .............................. | 23/37 |
| 99,957 | 11/1898 | Germany .............................. | 23/37 |
| 624,424 | 1/1936 | Germany .............................. | 23/37 |
| 842,682 | 7/1960 | United Kingdom..................... | 23/38 |

*Primary Examiner*—Jack Sofer
*Attorney, Agent, or Firm*—Fulwider, Patton, Rieber, Lee & Utecht

[57] ABSTRACT

The disclosure describes a method for producing coarse crystals of KCl from the direct decomposition of carnallite by mixing crushed carnallite in a high $MgCl_2$ liquor to form a non-decomposed slurry, passing said non-decomposed slurry into a crystallizer containing decomposition liquor, intensely re-circulating the thus formed mixture such that the driving force towards crystallization is substantially lessened, balancing the withdrawal of the decomposition liquor and the slurry such that a controlled amount of KCl remains in the crystallizer and continuously separating KCl crystals of a size selected from the range of −80 to −150 mesh whereby substantial quantities of about +50 mesh KCl crystals are formed and recovered.

7 Claims, 1 Drawing Figure

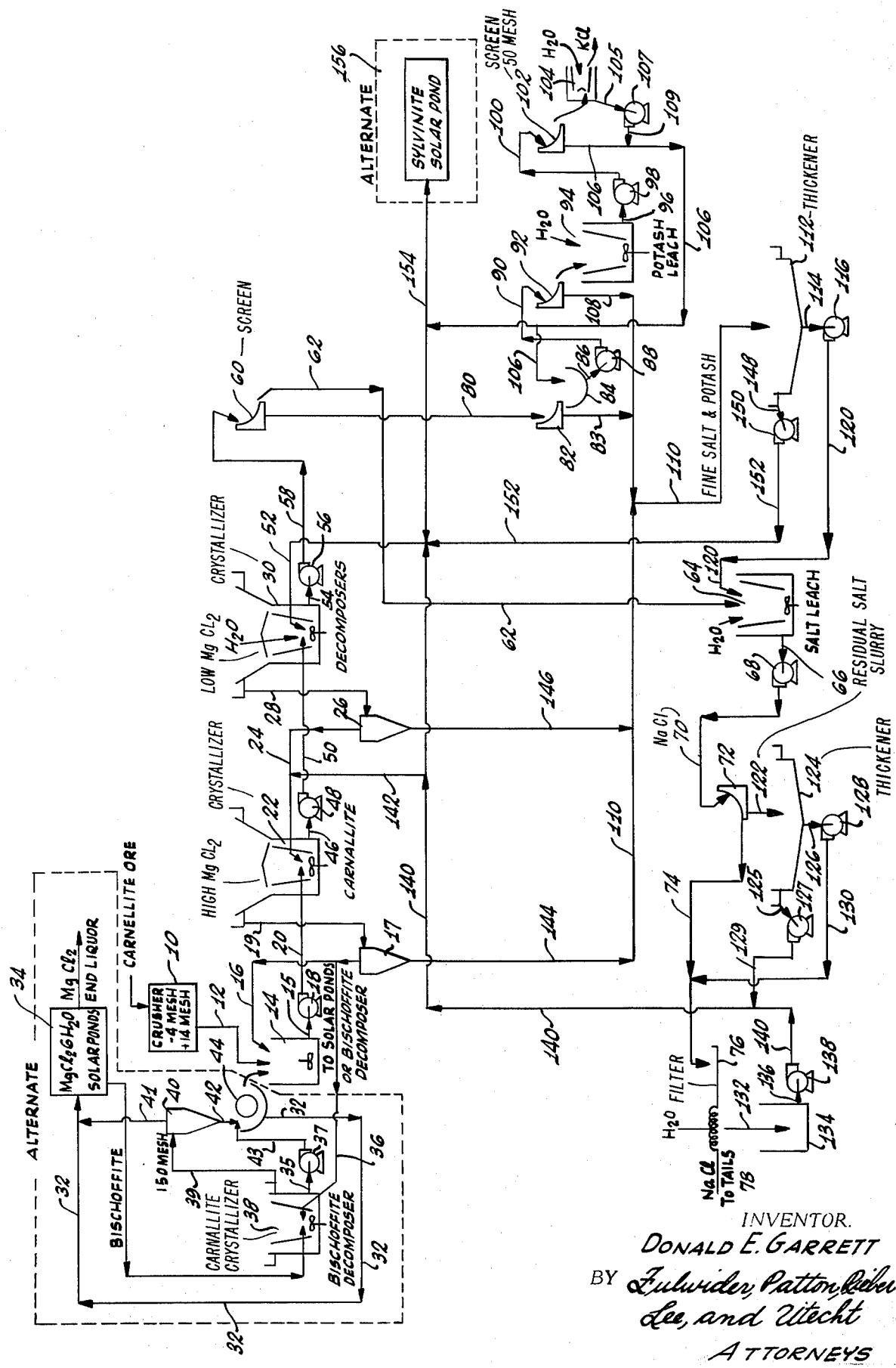

METHOD OF PRODUCING COARSE POTASH

CROSS-REFERENCE TO RELATED APPLICATION

This application is a continuation-in-part application of application Ser. No. 69,219 filed Sept. 3, 1970, now abandoned.

BACKGROUND OF THE INVENTION

The invention relates to an improved method for producing coarse potash. More particularly, this invention relates to a method whereby carnallite may be controllably decomposed to yield coarse potash directly.

Carnallite, $KCl.MgCl_2.6H_2O$, is a naturally occurring mineral that may be present with other potash salts or in massive deposits by itself. It may also be crystallized from potash brines as an intermediate product. When occurring with other salts, it is often considered a troublesome contaminant. However, in at least several industrial operations, a mixture of NaCl and carnallite is processed for its potash values. Its $MgCl_2$ content is dissolved in water, and then the KCl and NaCl separated by fractional leaching and crystallization or by flotation. This latter method works well, but the resulting KCl, under present practice, is of poor quality owing to its fine particle size (predominantly −100 mesh).

Another method of accomplishing an appreciable recovery of KCl from sylvinite and carnellite is described in U.S. Pat. No. 2,702,121 Colin et al., wherein potassium losses are minimized by employing a conventional froth flotation of KCl from sylvinite in a brine saturated with $MgCl_2$. The brine is maintained, at all times during flotation operations, saturated with respect to magnesium under the prevailing conditions. This process, however, results in a final KCl concentrate contaminated with appreciable amounts of $MgCl_2$ due to the commercial impossibility of displacement water washing of the KCl concentrate efficiently.

U.S. Pat. No. 2,968,525 to Clark, et al., describes a process for treating sylvinite which contains or is associated with small amounts of unwanted carnallite, by pretreating the carnallite containing sylvinite ore with a previously formed brine of NaCl, KCl and water wherein the magnesium content of the brine is less than the saturation quantity possible under the conditions prevailing. A counter-current leaching of carnallite containing ore decomposes the carnallite and effectively separates the magnesium of the carnallite. The thus treated ore is then subjected to a conventional foam flotation operation for sylvinite. This process is not suited for the treatment of ores containing substantial amounts of carnallite. The present invention, on the other hand, is directed towards the production of coarse crystals of potash from mineral deposits which contain substantial amounts of carnallite itself.

U.S. Pat. No. 2,827,366 to Saeman relates broadly to an apparatus for crystallization of various minerals of which KCl is not specifically disclosed. Saeman discloses broadly one aspect of the present invention, namely, the removing of undesirable fine crystals from a crystallizer and conserving the material contained in the thus extracted fine crystals by redissolving them and returning them to the crystallizer. While the present invention utilizes a similar step, it is only when this step is used in combination with the other disclosed steps that large crystals of KCl may be formed directly.

SUMMARY OF THE INVENTION

The present invention relates to a method for producing coarse crystals of KCl from the direct decomposition of carnallite, comprising: (a) crushing an ore containing substantial quantities of carnallite, (b) mixing said crushed ore in high $MgCl_2$ content liquor to form a slurry without substantially decomposing the carnallite, (c) passing said slurry into a crystallizer into which decomposition liquor is continuously added, (d) intensely re-circulating the thus formed mixture of the slurry and the decomposition liquor such that the amount of liquor which is being re-circulated is substantially greater than the amount of new decomposition liquid which is added whereby the driving force towards decomposing the carnallite and the crystallization of KCl is substantially lessened, (e) maintaining a controlled amount of KCl seed in the crystallizer, said amount being from about 10–40 weight % solids in the slurry, (f) continuously separating KCl crystals of a size selected from the range of −80 to −150 mesh whereby substantial quantities of about +50 mesh KCl crystals are formed and (g) recovering said +50 mesh KCl crystals.

The present invention also provides a means for conserving excess fine KCl crystals comprising the additional step of dissolving the separated KCl crystals and subsequently returning said dissolved crystals to the crystallizer whereby further growth of the larger KCl crystals which are maintained in the crystallizer is promoted.

BRIEF DESCRIPTION OF THE DRAWINGS

The drawing shows a schematic flow sheet of the preferred embodiment together with functionally similar alternate means.

DESCRIPTION OF THE INVENTION

Generally, the carnallite ore is crushed to about 4 mesh in a manner to produce a minimum of fines, and then repulped in end liquor having a high $MgCl_2$ content so as not to substantially decompose the carnallite. By high $MgCl_2$ content is meant that the slurry liquor contain at least 68 mols of $MgCl_2$ per 1000 mols of water. This amount is independent of proportions of other salts which may be present in the slurry liquid. At this $MgCl_2$ level and above, little or no decomposition of the carnallite occurs. This slurry is sent to a first carnallite decomposer-crystallizer wherein a portion of its carnallite content is decomposed in liquor from a second decomposer-crystallizer. The remaining carnallite and NaCl, and the KCl formed, is sent to the second decomposer-crystallizer wherein the remaining carnallite is decomposed in a slight excess of lower-$MgCl_2$ brine, part of which liquor results from the leaching of salt, product potash, or potash fines.

Decomposition liquors may have an $MgCl_2$ level ranging from 0 to 65 mols/1000 mols of $H_2O$ and it is highly preferred that both the decomposition liquors of the first and second decomposer-crystallizers be maintained at the higher end of the range in order to retard carnallite decomposition. Slow decomposition favors the formation of larger KCl crystals.

Intense re-circulation is maintained in the decomposer-crystallizers so that the supersaturation level is always low. This is an important aspect of the present invention to further prevent the formation of fine KCl crystals by preventing the solubilized KCl from instantly crystallizing as fine crystals. Rather, the intense recirculation tends to favor the enlargement of the already present +100 mesh KCl crystals thereby making possible the production of the desired +50 mesh KCl crystals. Furthermore, a heavy seed bed of KCl is maintained in the crystallizing zone. The amount of KCl seed may range from about 10–40 weight % solids in the slurry and preferably from about 15–30 weight %.

To recover the +50 mesh KCl, the slurry of salt and potash from the second decomposer-crystallizer is screened to remove all of the coarse salt (+14 mesh). This waste salt is leached with water, rescreened, filtered, and sent to the tailings pond. The potash slurry coming through the salt screen is screened at about 50 mesh, repulped in the washings from a second potash screen, and then leached with water sufficient to remove most of its salt content. The remaining large crystals of KCl are screened, dewatered, and washed, and then sent to a dryer and product storage.

The fine salt and potash that has gone through both the salt and potash screens (and thus is −50 mesh) is thickened and sent to leach tanks where its potash content is dissolved in the repulp water, as is the potash content of the screened salts. The residual salt slurry is thickened, filtered, washed and sent to the tailings pond.

In the carnallite decomposer-crystallizers, the overflow liquor is at a velocity to elutriate particles in the range of −80 to −150 mesh. If the rate is such that −80 mesh particles are elutriated, there tends to be formed a larger amount of larger KCl crystals. Conversely, if the rate is such that −150 mesh particles are elutriated, a larger number of smaller KCl crystals are produced. Thus, the selection of the particular particle size to be elutriated within the disclosed range depends upon the amount and size of the product desired. This elutriation condition is maintained in the crystallizers to remove most of the fine potash as it is formed, helping to prevent fine seed from being present.

The overflow from the first decomposer-crystallizer is cycloned or hydroseparated and the separated particles (approximately +200 mesh) are sent to a thickener for later leaching of their potash values. The overflow from the second crystallizer is likewise cycloned, and the −100 mesh particles are sent to the fine potash-salt thickener, and the liquor, which is free of fine KCl crystals, sent to the first crystallizer. Water or lower $MgCl_2$ content liquor should be added to this liquor feed to the first crystallizer to dissolve any very fine KCl crystals that escape the cyclone and are in the liquor.

The liquor overflowing the first crystallizer and its cyclone may be either discarded, sent to carnallite solar ponds, or part of it sent to carnallite-bischofite solar ponds (or evaporators), and the rest sent to a carnallite crystallizer where it reacts with bischofite to form more carnallite. This carnallite is cycloned, thickened or dewatered, and added to the main feed of carnallite ore. The cycloned −200 mesh particles and liquor are discarded.

DESCRIPTION OF THE PREFERRED EMBODIMENT

More specifically, referring to the drawing, there is shown a schematic flow sheet diagram wherein carnallite ore is crushed at 10 from about 4 to 14 mesh in a manner to produce a minimum of fines and then is introduced into reactor 14 by line 12 where it is repulped in end liquor high in $MgCl_2$ content to avoid substantial decomposition of the carnellite, the end liquor being introduced by line 16. The resulting slurry from vessel 14 is introduced into a first decomposer-crystallizer 22 through line 15, pump 18 and line 20. In decomposer-crystallizer 22, a major portion of the carnallite therein is decomposed in overflow liquor from a second decomposer-crystallizer 30 introduced through line 24.

The remaining carnallite, NaCl and the KCl in the first decomposer-crystallizer is introduced into the second decomposer-crystallizer 30 through line 46, pump 48 and line 50 wherein the remaining carnallite is decomposed in a slight excess of lower-$MgCl_2$ brine introduced through line 52. The resultant slurry is carried by line 54, pump 56 and line 58 to 14 mesh screen 60. All of the +14 mesh salt (NaCl) is thus removed and is sent by line 62 to a reactor 64 wherein such waste salt is leached with water.

The potash slurry coming through screen 60 is carried by line 80 to 50 mesh screen 82. All of the +50 mesh KCl is repulped in reactor 84 in the washings from screen 102 via line 106 and reactor 104 via line 105, pump 107 and lines 109 and 106. The +50 mesh KCl is then passed by line 86, pump 88 and line 90 through a second 50 mesh screen 92. The resulting +50 mesh screened KCl is leached with water in reactor 94 to remove most of its salt content and is then introduced by line 96, pump 98 and line 100 to screen 102 and thence to reactor 104 where the resulting +50 mesh KCl is dewatered and washed and sent to a dryer and produce storage. The washings from screen 102 can go via line 106 as described above or alternatively, via line 154 to the sylvinite solar pond 156.

The fine salt and potash that has gone through both the salt screen 60 and potash screens 82 and 92 (and is thus −50 mesh) are brought by lines 83, 108 and 110, to thickener 112. The resulting thickened salt and potash fines is sent through line 114, pump 116 and line 120 to leach tank 64 where its potash content is dissolved in the repulp water, as is the potash content of the screened salt introduced through line 62. The resultant material is passed through line 66, pump 68 and line 70 to screen 72 where the salt is again screened. Following this screening, the salt is taken by line 74 and filtered by filter 76 and sent to the tailings pond through line 78. The fluid removed by thickener 112 is returned via line 148, pump 150 and lines 152 and 52 to the second decomposer-crystallizer 30.

The residual salt slurry passing through screen 72 is carried by line 122 to thickener 124 and the thickened salt slurry is carried by line 126, pump 128 and line 130 to filter 76 where it is washed and sent to the tailings pond. The decanted liquid from thickener 124 is passed via line 125, pump 127 and line 129 to line 140. The dissolved KCl carried by the wash water which passes through filter 76 is passed through line 132 to container 134 and thence through line 136, pump 138, line 140 to lines 142 and 52 which lines carry the dissolved KCl to the first and second decomposer-crystallizers, respectively. The flow in line 142 is controlled to maintain a high-$MgCl_2$ concentration in the first reactor liquor. Additional water is added to the second decomposer-crystallizer to maintain the required lower-$MgCl_2$ concentration therein.

In the first and second carnallite decomposer-crystallizers, the overflow liquor is kept at a velocity to elutriate a fairly coarse particle, such as +100 mesh. The decanted slurries from the first and second decomposer-crystallizers are carried by lines 19 and 28, respectively, to cyclones 17 and 26, respectively. The slurry is cycloned or hydroseparated and the resulting solids are sent via lines 144 and 146 to line 110 to thickener 112 for leaching of their potash values as previously described.

The liquor overflowing the first decomposer-crystallizer 22 and its cyclone 17 may be either sent to reactor 14 via line 16 or sent to a carnallite crystallizer 38 through line 36 where it reacts with bischofite to form more carnallite. The liquid portion of the carnallite is introduced into cyclone 40 through line 39. The aqueous portion goes to the solar ponds through line 41 and the carnallite goes to thickener 44 through line 42. Carnallite is also introduced into thickener 44 from crystallizer 38 via line 35, pump 37 and line 43. The resultant carnallite in thickener 44 is then added to the main feed of carnallite ore at reactor 14. The water released from thickener 44 goes to the solar ponds through line 32.

The decomposer-crystallizers to be used in the present invention are generally of the standard pachuca type, but adapted for solid phase transformation. They must be designed so as to allow for the intense recirculation earlier described as well as for the elutriation of the fine KCl crystals. Thus, the crystallizer may have a settling zone on top of the crystallizer or outside of the crystallizer. The latter design is useful if solids are dumped directly into the crystallizer. Direct dumping can only be conveniently done with a crystallizer having an outside settling zone. Depending upon its size, the crystallizer can have the propeller mounted in the top (thus reversing the flow), or, more conventionally the propeller can be at the bottom as shown in the drawing.

Under the conditions shown, as much as one-third of the crystallized potash can be under 50 mesh, and then redissolved and recrystallized, and still not result in a significant loss in yield or capacity. However, if more fines should occasionally or regularly be produced, the excess dissolving water can be sent to sylvinite solar ponds, or the product size slightly lowered. If sylvinite ponds are used, the harvested salts may be added directly to the salt screen circuit. However, under normal circumstances only about ten percent of the potash is dissolved, exclusive of dust, spillage, etc., and other solids returned for reworking.

Utilizing the above-described techniques, the present invention may be used to directly produce substantial quantities of coarse (+50 mesh) potash where heretofore only fine (—100 mesh) material could be produced directly by decomposing carnallite. These techniques must be used in combination as indicated in order to directly produce such coarse crystals. By closer control on the conditions the potash crystals can be made larger, but capacity would be somewhat reduced. The potash crystals formed that are —100 mesh can be effectively used by being dissolved and re-introduced as the decomposing liquor. In a similar manner, any potash remaining with the salt tails, or any salt with the potash product, can be leached and the liquors efficiently used in the process.

Any slimes or insolubles entering with the ore can be handled without special equipment, for their presence will not interfere with the carnallite crystallizer-decomposer, nor hurt the product quality; they will either be removed with the coarse salt, the fine salt, or pass off with the end liquor. If through an accident of crushing, any appreciable amount of insolubles are present in the —14+50 size range, this fraction should be screened off prior to entering the first crystallizer, and handled separately. Depending upon the quantity of the insolubles it can be sent to the fine potash leach circuit or ground to —50 mesh and then introduced into the first decomposer-crystallizer.

If it is not possible to obtain a decomposer feed that is principally +14 mesh, such as would be the case with solar evaporation carnallite, it may be ground to —50 mesh and the salt all rejected as the underflow from a 50 mesh screen or hydroseparator. Alternately, if neither size separation technique is practical with the ore in question, the mixed NaCl-KCl product may be separated by flotation rather than by size.

Because of the relative simplicity of the equipment involved with this process, alternate means are available for carrying out the invention. Thus, it is possible that a substantial cost reduction can be made by carrying out a substantial portion of the processing of the invention underground. This avoids the hauling of the ore to the surface which involves greater costs than merely pumping a slurry of potash crystals to the surface. Furthermore, the unsightly waste materials of the process can be simply left underground in the worked out portion of the mine.

To illustrate the manner in which the invention may be carried out, the following examples are given. It is to be understood that the examples are for the purpose of illustration and the invention is not to be regarded as limited to any of the specific conditions recited therein. Unless otherwise specified, parts disclosed in the examples are parts by weight.

EXAMPLE I

A carnallite ($KCl.MgCl_2.6H_2O$) decomposition to potash (KCl) was carried out in a draft tube crystallizer that was 8 inches in diameter and 12 inches high. A propeller-type of agitator was inserted into a 4-inch center draft tube. A second tube separated the active 6,400 milliliter crystallization zone from the quiet settling zone. The active crystallization area between the two tubes was baffled to eliminate any liquid swirling.

Carnallite containing 50% NaCl was fed at 40 grams per minute. The decomposition water was fed to maintain an end liquor composition near the $KCl.MgCl_26H_2O$)-KCl-NaCl triple point to give an end liquor containing 20.28 weight percent magnesium chloride ($MgCl_2$). The overflow velocity from the quiet zone was 2.67 inches per minute. The slurry density was maintained at 18 volume percent by the control withdrawal of the product. The product analyzed at 24 weight percent of plus 48 mesh, 80 weight percent of plus 80 mesh and 19 weight percent of minus 100 mesh after including the elutriated fines in the product.

EXAMPLE II

Carnallite decomposition tests were run using a 1.2 gallon draft-tube crystallizer with bottom agitation. The decomposition liquor was fed to the eye of the impeller of the agitator, to give good mixing, into a large re-circulating stream. Feed liquor, containing 6.38 weight percent of $MgSO_4$, 13.98 wt. % of $MgCl_2$, 5.43 weight % of KCl and 5.24 weight % of NaCl, was reacted with 30.7 grams per minute of solids containing 55 weight % of carnallite, 22 weight of epsomite, and 23 weight % of NaCl, which were fed at a rate of 23.9 grams per minute. The potash product analyzed at 46 weight % of plus 48 Tyler mesh, 88 weight % of plus 60 mesh, 91 weight % of plus 80 mesh and 9 weight % of minus 80 mesh.

I claim:

1. A method for producing coarse crystals of KCl from the direct decomposition of carnallite, comprising:
   a. crushing an ore containing substantial quantities of carnallite;
   b. mixing said crushed ore in an aqueous liquor having a $MgCl_2$ content of at least about 68 mols per 1,000 mols of water to form a slurry whereby decomposition of said carnallite is substantially prevented;
   c. passing said slurry into a crystallizer into which an aqueous decomposition liquor having an $MgCl_2$ content up to about 65 mols per 1,000 mols of water is continuously added;
   d. intensely re-circulating within the crystallizer the thus formed mixture of the slurry and the decompositon liquor such that the amount of liquor which is being re-circulated is substantially greater than the amount of new decomposition liquor which is added, whereby the driving force towards decomposing the carnallite and the crystallization of KCl is substantially lessened;
   e. introducing and maintaining in said crystallizer between about 10 wt. % and about 40 wt. % of KCl seed, said wt. % being based on the weight of solids in said slurry;
   f. continuously forming KCl crystals in said crystallizer and elutriating therefrom KCl crystals of a size -80 mesh thereby to promote formation of about +50 mesh KCl crystals;
   g. recovering said +50 mesh KCl crystals.

2. A method as in claim 1 wherein the controlled amount of KCl seed in the crystallizer ranges from about 15-30 weight % solids in the slurry.

3. A method as in claim 1 having the additional step of dissolving the separated KCl crystals and subsequently returning said dissolved crystals to the crystallizer whereby further growth of the larger KCl crystals which are maintained in the crystallizer is promoted.

4. A method as in claim 1 wherein a substantial amount of the processing takes place underground.

5. A method for producing coarse crystals of KCl resulting from the direct decomposition of carnallite, comprising:
   a. crushing an ore containing substantial quantities of carnallite;
   b. mixing said crushed ore in an aqueous liquor from a first decomposer-crystallizer to form a slurry in a reactor, said liquor having an $MgCl_2$ content of at least about 68 mols per 1,000 mols of water such that substantial decomposition of said carnallite is prevented;
   c. passing said slurry from said reactor into said first decomposer-crystallizer wherein a portion of its carnallite content is decomposed by an aqueous liquor from a second decomposer-crystallizer having an $MgCl_2$ content of not more than about 65 mols per 1,000 mols of water;
   d. passing the remaining carnallite from said first decomposer-crystallizer to said second decomposer-crystallizer wherein said remaining carnallite is decomposed by a slight excess of lower-$MgCl_2$ brine;
   e. maintaining intense re-circulation in said first and second decomposer-crystallizers such that the supersaturation level of the slurry is substantially minimized whereby the driving force towards the decomposition of carnallite and the crystallization of KCl is substantially lessened;
   f. maintaining from 10-40 weight % solids of KCl seed in said first and second decomposer-crystallizers by balancing the withdrawal of liquor and slurry;
   g. continuously elutriating KCl crystals of a size selected from the range of −80 to −150 mesh from said first and second decomposer-crystallizers, whereby substantial quantities of about +50 mesh KCl crystals are formed in the crystallizers; and
   h. recovering said +50 mesh KCl crystals.

6. A method as in claim 5 having the additional step of dissolving the elutriated KCl crystals to form a liquor and sequentially returning said liquor to said first and second decomposer-crystallizers whereby additional growth of the maintained +100 mesh crystals of KCl is promoted.

7. A method as in claim 5 wherein the controlled amount of KCl seed ranges from about 15-30 weight % solids in the slurry.

* * * * *